United States Patent
Lyon

[11] Patent Number: 6,086,255
[45] Date of Patent: Jul. 11, 2000

[54] HYDROSTATIC BEARING AND FLUID COLLECTION SYSTEM

[75] Inventor: Gregory S. Lyon, Mamaroneck, N.Y.

[73] Assignee: Thompson Industries, Inc., Port Washington, N.Y.

[21] Appl. No.: 09/123,636

[22] Filed: Jul. 28, 1998

[51] Int. Cl.[7] ................................................. F16C 32/06
[52] U.S. Cl. ............................... 384/12; 384/16; 384/100
[58] Field of Search .................................. 384/13, 15, 16, 384/12, 100

[56] References Cited

U.S. PATENT DOCUMENTS

| | | |
|---|---|---|
| 2,449,297 | 9/1948 | Hoffer . |
| 3,355,990 | 12/1967 | Thum ..................................... 384/12 X |
| 3,499,690 | 3/1970 | Siebers ...................................... 384/12 |
| 3,582,159 | 6/1971 | Uhtenwoldt . |
| 3,635,532 | 1/1972 | Zerbola ..................................... 384/12 |
| 3,717,392 | 2/1973 | Ennis . |
| 3,754,799 | 8/1973 | Hedberg . |
| 3,900,233 | 8/1975 | Thomson . |
| 4,080,009 | 3/1978 | Marathe et al. . |
| 4,272,216 | 6/1981 | Osburn .................................. 384/12 X |
| 4,351,574 | 9/1982 | Furukawa et al. . |
| 4,368,930 | 1/1983 | Duchaine . |
| 4,749,283 | 6/1988 | Yokomatsu et al. ................... 384/16 X |
| 4,753,311 | 6/1998 | Berger et al. . |
| 4,932,067 | 6/1990 | Pester et al. ............................... 384/45 |
| 5,010,794 | 4/1991 | Klager .................................. 384/107 X |
| 5,104,237 | 4/1992 | Slocum ..................................... 384/12 |
| 5,391,002 | 2/1995 | Eigenbrod ................................. 384/12 |
| 5,484,208 | 1/1996 | Kane et al. ............................... 384/12 |

FOREIGN PATENT DOCUMENTS

| | | |
|---|---|---|
| 0361026 | 4/1990 | European Pat. Off. . |
| 0798478 | 3/1996 | European Pat. Off. . |
| 3339316 | 5/1985 | Germany . |

*Primary Examiner*—Thomas R. Hannon
*Attorney, Agent, or Firm*—Dilworth & Barrese

[57] ABSTRACT

A hydrostatic bearing assembly and fluid return system is provided for collecting and returning hydrostatic fluid which exits the bearing assembly to a remote location. The bearing assembly and fluid return system includes a hydrostatic bearing which is connected to supply and return reservoirs by supply and return hoses or conduits, respectively. The bearing assembly includes a carriage having a bushing secured within the carriage between a pair of retaining rings. A collection cylinder is fixedly positioned between each retaining ring and one end of the bushing. Each collection cylinder defines a collection chamber adjacent one end of the carriage, which is positioned to receive hydrostatic fluid exiting a gap defined between the carriage and a support rail. The return hoses or conduits each have a first end that communicates with one of the collection chambers and a second end that communicates with remotely located reservoir. Hydrostatic fluid exiting the gap is collected in the collection chambers and subsequently returned to a collection reservoir.

11 Claims, 7 Drawing Sheets

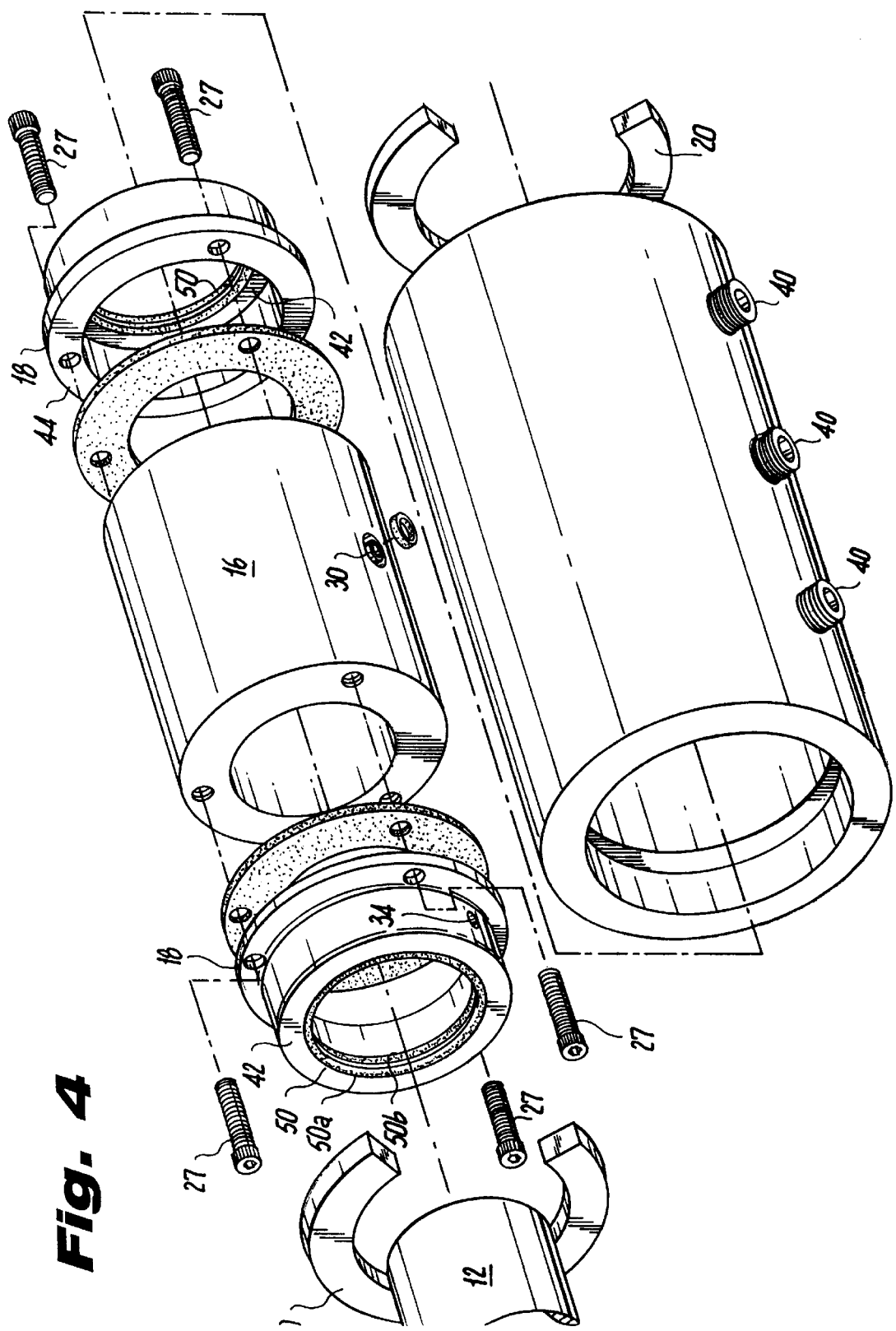

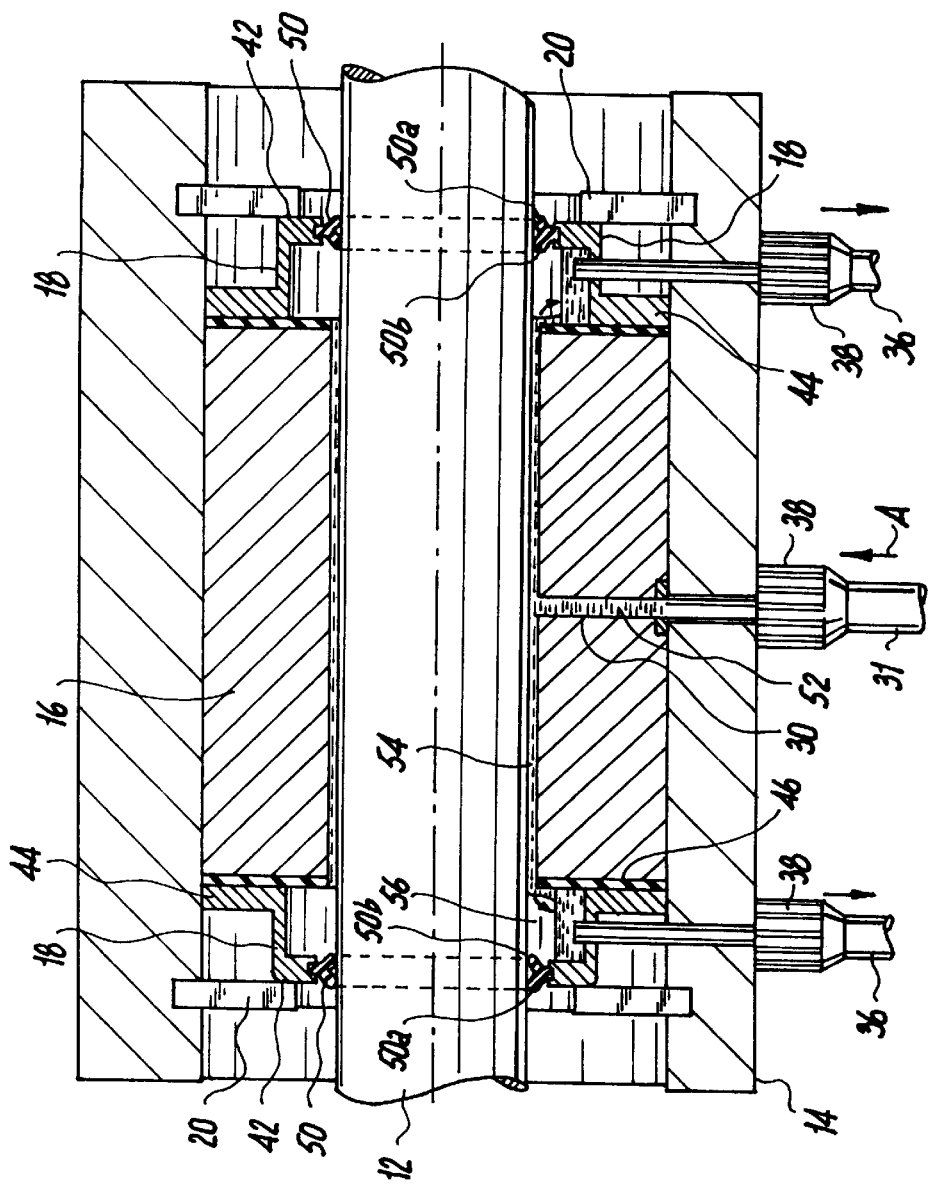

HYDROSTATIC BEARING AND FLUID COLLECTION SYSTEM

BACKGROUND

1. Technical Field

The present invention relates to a hydrostatic bearing assembly and, more particularly, to a hydrostatic bearing assembly and fluid collection system.

2. Background of Related Art

Linear motion hydrostatic bearing assemblies are well known and have been used for many years for the near frictionless movement of masses. Hydrostatic bearings are characterized as having excellent low friction, accuracy, and repeatability characteristics, with a theoretically infinite life. Hydrostatic bearings also have excellent damping characteristics which result from hydrostatic fluid acting as a shock absorber between the apparatus to which the bearing is associated and an applied load.

Hydrostatic bearings maintain the distance between a bearing race and a support rail by providing a thin pressurized film of fluid in the gap between the bearing race and the rail. Hydrostatic fluid is supplied to the bearing gap from a source of fluid under constant pressure. Typically, the fluid drips from the gap and is collected in a basin or tray located in the area below the hydrostatic bearing assembly and the support rail. Thus, a collection tray must be positioned along the length of the rail. Because a continuous flow of hydrostatic fluid maintained at a constant pressure is supplied to the bearing, a substantial amount of fluid can collect in the collection trays resulting in increased bearing operating costs and sloppy and/or dangerous working conditions.

Accordingly, a need exists for an improved linear motion hydrostatic bearing assembly having a system for collecting and recirculating hydrostatic fluid exiting the bearing gaps and dripping from the support rail.

SUMMARY

In accordance with the present disclosure, a hydrostatic bearing assembly and fluid collection system is provided for collecting and returning hydrostatic fluid which exits the bearing assembly to a remote location. The bearing assembly and fluid collection system includes a hydrostatic bearing which is connected to supply and return reservoirs by supply and return hoses or conduits, respectively. The bearing assembly includes a carriage having a bushing secured within the carriage between a pair of retaining rings. A collection cylinder is fixedly positioned between each retaining ring and one end of the bushing. Each collection cylinder defines a collection chamber adjacent one end of the carriage, which is positioned to receive hydrostatic fluid exiting a gap defined between the carriage and a support rail. The collection cylinder includes a stepped member having an inner cylindrical portion positioned adjacent the support rail and an outer flange portion adapted to be secured to the bushing. In one preferred embodiment, a resilient double lip seal or wiper member is secured to the inner cylindrical portion of the collection cylinder and is positioned to engage and be partially deformed by the support rail. One lip of the double lip seal is deformed outwardly of the collection cylinder to prevent entry of debris into the bearing assembly and the other lip of the double lip seal is deformed into the collection cylinder to direct fluid exiting the gap into the collection chamber. The supply hose or conduit has a first end that communicates with a supply of hydrostatic fluid and a second end that communicates with an inlet port in the bearing assembly for supplying fluid to the bearing gap. The return hoses or conduits each have a first end that communicates with one of the collection chambers and a second end that communicates with remotely located reservoir.

In another preferred embodiment, a venturi or vacuum pump is provided to draw a vacuum on a fluid reservoir and each of the return conduits is connected to the top of the reservoir such that a vacuum is also drawn on the return conduits. A nozzle plate including a nozzle opening is positioned within the carriage adjacent the collection chambers. When the venturi is activated, fluid is caused to flow from the collection chambers, through the nozzle plate and return conduits, into the reservoir. A supply pump is provided to recirculate the fluid returned to the reservoir from the bearing assembly back to the bearing assembly via a purification assembly.

BRIEF DESCRIPTION OF THE DRAWINGS

Various preferred embodiments are described herein with reference to the drawings, wherein:

FIG. 4 is a perspective view with parts separated of the hydrostatic bearing and fluid return system shown in FIG. 1;

FIG. 5 is a side cross-sectional view of the hydrostatic bearing and fluid return system shown in FIG. 1;

DETAILED DESCRIPTION OF PREFERRED EMBODIMENTS

Figure 1:
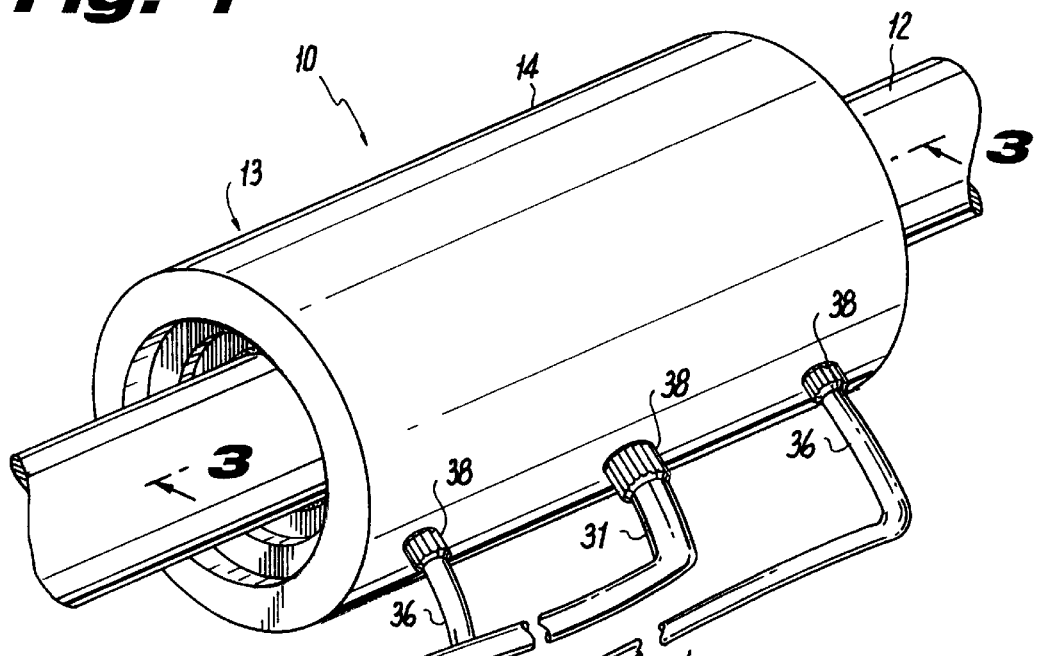
FIG. 1 is a perspective view of one embodiment of the presently disclosed hydrostatic bearing and fluid return system.

Preferred embodiments of the presently disclosed hydrostatic bearing and fluid collection system will now be described in detail with reference to the drawings, in which like reference numerals designate identical or corresponding elements in each of the several views.

Figure 2:
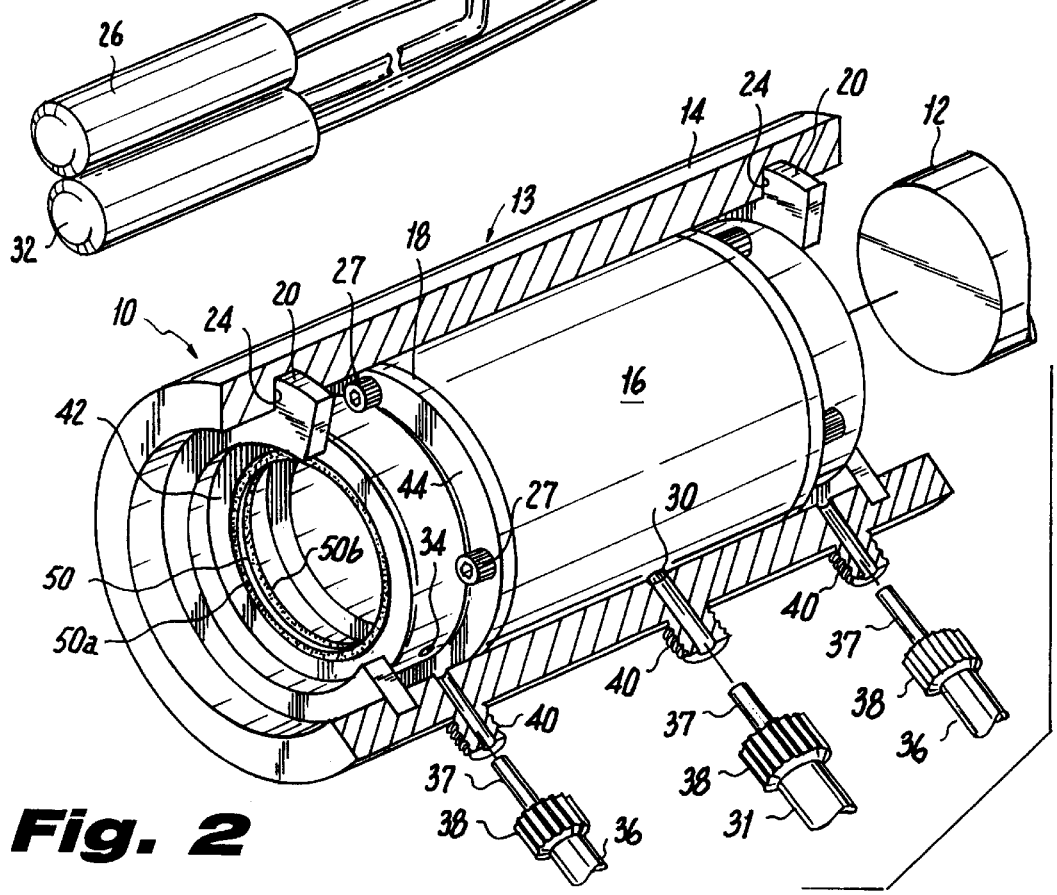
FIG. 2 is a perspective partial cross-sectional view of the hydrostatic bearing and fluid return system shown in FIG. 1.

FIGS. 1 and 2 illustrate one embodiment of the presently disclosed hydrostatic bearing and fluid collection system, shown generally as 10. Briefly, hydrostatic bearing and fluid collection system 10 includes a hydrostatic bearing 13, a supply reservoir 26, a return reservoir 32, a supply hose 31 and return hoses 36 Supply hose 31 connects supply reservoir 26 to hydrostatic bearing 13 and return hoses 36 connect bearing 13 to return reservoir 32.

Hydrostatic bearing 13 includes a cylindrical carriage 14 and a hydrostatic bushing 16 positioned within the carriage.

Figure 3:
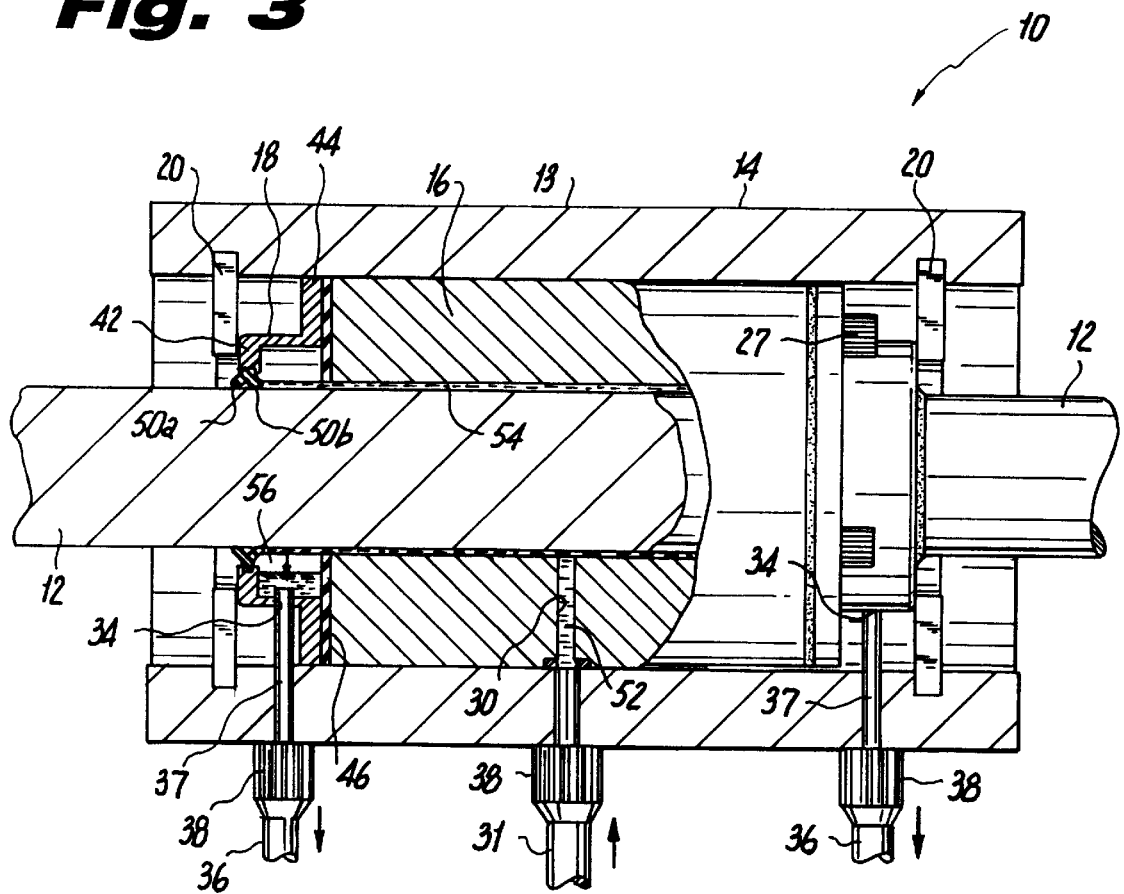
FIG. 3 is a side partial cross-sectional view of the hydrostatic bearing and fluid return system taken along section line 3—3 of FIG. 1.

Bushing 16 has a throughbore configured and dimensioned to receive a support rail 12. Referring also to FIGS. 3 and 4, a collection cylinder 18 is secured to each end of hydrostatic bushing 16 using threaded bolts 27. Alternately, other securement devices may also be used to secure the collector cylinders to the hydrostatic bushing. Retaining rings 20 are positioned within grooves 24 formed in the inner wall of cylindrical housing 14 to secure hydrostatic bushing 16 at a longitudinally fixed position within cylindrical housing 14.

Supply reservoir 26 contains pressurized hydrostatic fluid and is connected to supply port 30 in hydrostatic bushing 16 by supply hose 31. The pressure differential between reservoir 26 and supply port 30 causes hydrostatic fluid to flow from the reservoir to the supply port. Alternately, a positive displacement pump located between supply port 30 and reservoir 26 can be used to supply hydrostatic fluid to the bearing supply port from the reservoir.

Return reservoir 32 is connected to return ports 34 formed in collection cylinders 18 by return hoses 36. Each return hose 36 includes a distal extension 37 dimensioned to extend through cylindrical housing 14 and communicate with a respective return port 34. Each of the supply and return hoses includes a fitting 38 adapted to engage a respective fitting 40 secured to cylindrical housing 14.

Referring to FIGS. 3 and 4, each of the collector cylinders 18 includes a stepped member having an inner radial flange portion 42 dimensioned to closely surround support rail 12 and an outer radial flange portion 44 configured to be secured to an end wall of hydrostatic bushing 16 via bolts 27. A gasket 46 is preferably positioned between each collection cylinder 18 and a respective bushing end wall to provide sealing. A double lip seal or wiper member 50 is secured to the inner cylindrical portion 42 of collector cylinder 18. Double lip seal 50 is constructed from a resilient material, e.g., rubber, and is positioned to be partially deformed by support rail 12 such that one lip 50a is deformed outwardly of collection cylinder 18 and one lip 50b is deformed inwardly of collector cylinder 18.

Figure 6:
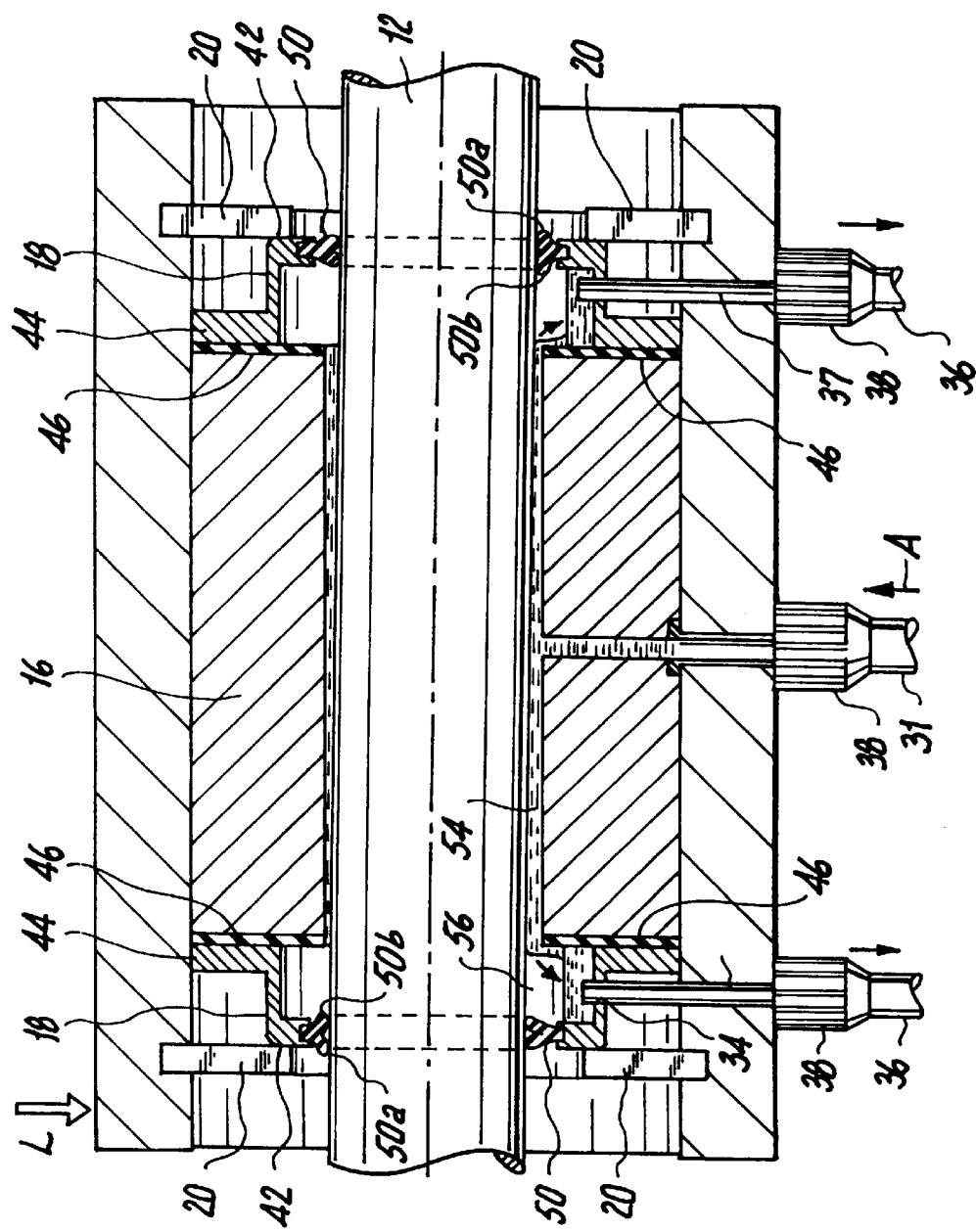
FIG. 6 is a side cross-sectional view of the hydrostatic bearing and fluid return system shown in FIG. 5 with a load applied thereto.

Referring to FIGS. 5 and 6, hydrostatic fluid 52 is supplied to supply port 30 in hydrostatic bushing 16 from supply reservoir 26 (FIG. 1) through supply hose 31, in the direction indicated by arrow "A". Fluid 52 fills the gap 54 defined between hydrostatic bushing 16 and support rail 12. Inwardly deformed lip 50b of double lip seal 50 prevents hydrostatic fluid 52 in the gap from exiting hydrostatic bearing 13. Inner cylindrical portion 42 of collection cylinders 18 form annular collection chambers 56 at each end of hydrostatic bearing 13. Hydrostatic fluid 52 flowing beyond bushing 16 is diverted into collection chamber 56 by lip 50b of double lip seal 50, where it is subsequently returned to collection reservoir 32 (See FIG. 1) via return port 34 and return hoses 36. The outwardly deformed lip 50a of double lip seal 50 prevents contaminants from entering hydrostatic bearing 13 and mixing with hydrostatic fluid 52. Although not shown, purification equipment and/or a pump may be provided to facilitate recirculation of the hydrostatic fluid to the bearing assembly.

Figure 7:
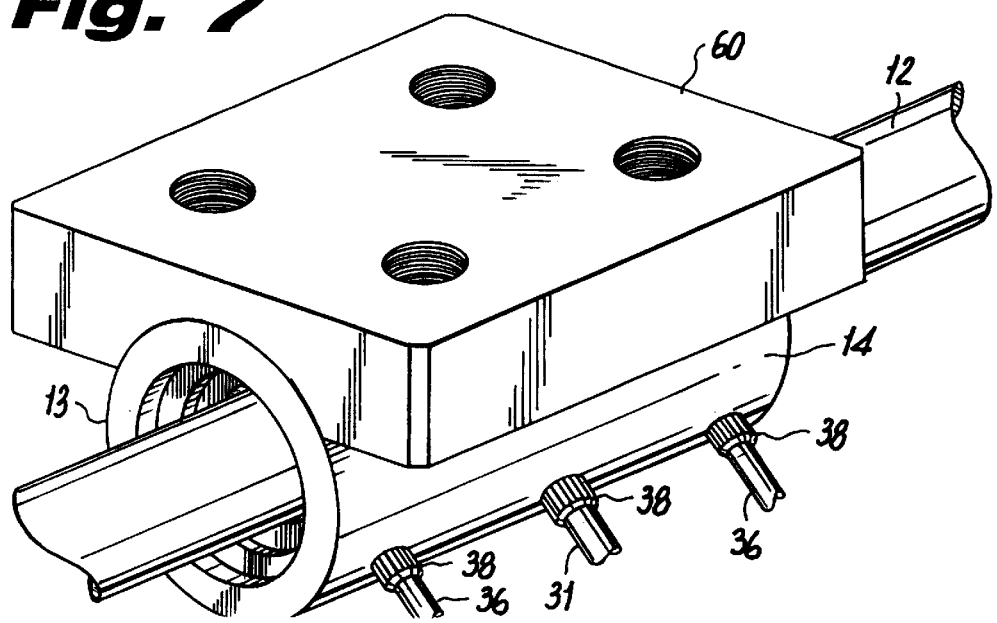
FIG. 7 is a perspective view of the hydrostatic bearing and fluid return system shown in FIG. 1 with a mounting plate secured on the housing of the hydrostatic bearing.

Referring to FIG. 7, a mounting plate 60 can be secured to cylindrical housing 14 to mount a load (not shown) thereon. Mounting plate 60 may include mounting structure, e.g., threaded bores 62, to facilitate attaching the load thereto. Alternately, mounting plate 60 can be secured to a plurality of bearings 13, which are slidably positioned on a single or multiple rails.

Figure 8:
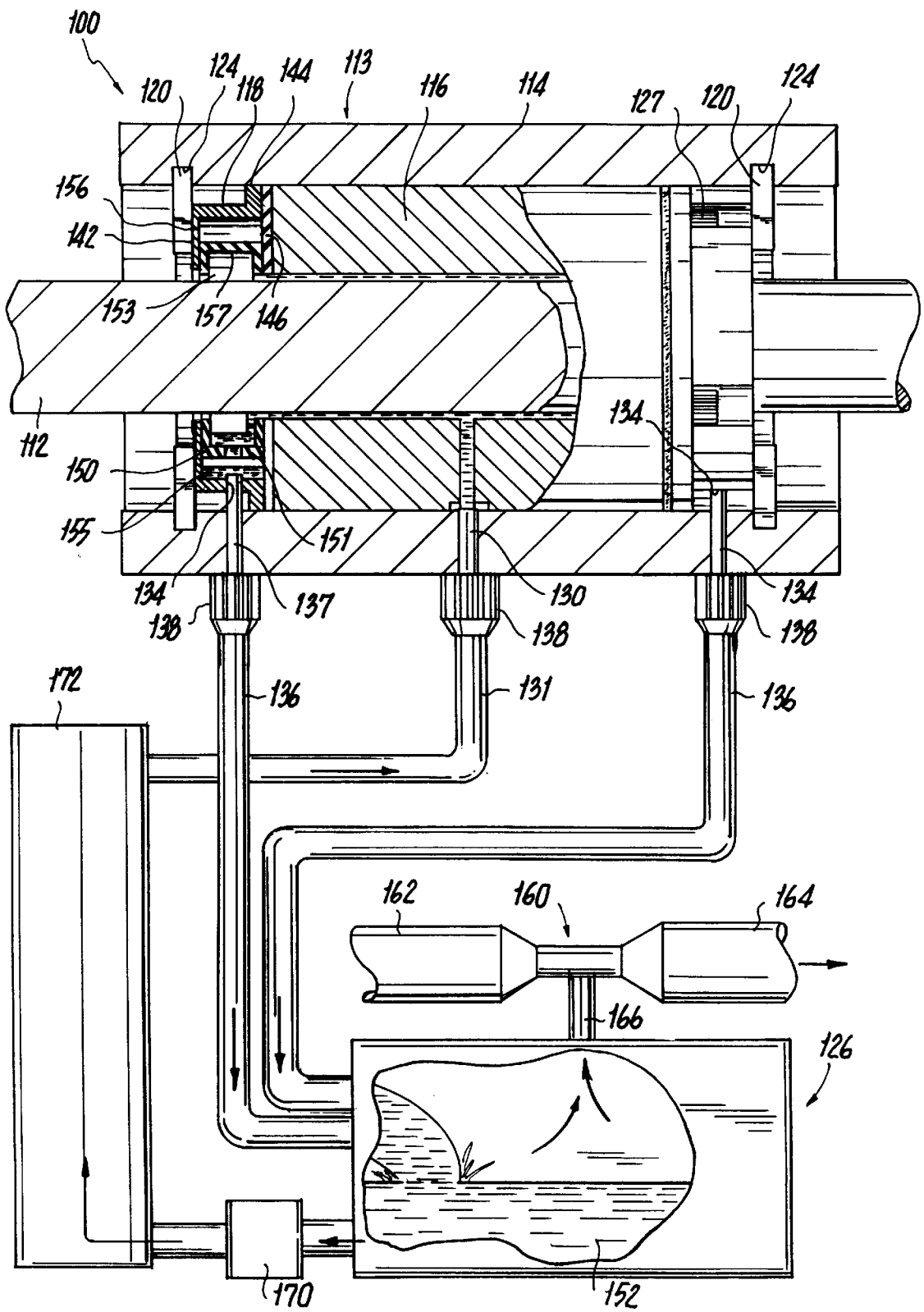
FIG. 8 is a side partial cross-sectional view of an alternate embodiment of the hydrostatic bearing and fluid return system.

FIG. 8 illustrates an alternate embodiment of hydrostatic bearing and fluid return system, shown generally as 100. Hydrostatic bearing and fluid return system 100 includes a hydrostatic bearing 113 having cylindrical housing 114 and hydrostatic bushing 116 positioned therein. A pair of collection cylinders 118 are secured to respective ends of hydrostatic bushing 116. Retaining rings 120 are positioned within grooves 124 formed in the inner wall of cylindrical housing 114 to secure hydrostatic bushing 116 at a longitudinally fixed position within the cylindrical housing. A reservoir 126 containing hydrostatic fluid 152 is connected to return ports 134 formed in collection cylinders 118 and to supply port 130 formed in hydrostatic bushing 116 by flexible supply and return hoses 131 and 136, respectively. Each return hose includes a distal extension 137 dimensioned to extend through cylindrical housing 114 to communicate with return ports 134. A rotatable fitting 138 is positioned on one end of each of supply and return hoses 131 and 136 to secure each hose to a respective fitting (not shown) formed on cylindrical housing 114.

Each of collection cylinders 118 includes a stepped member having an inner radial flange portion 142 defining a collection chamber 156 and dimensioned to slidably receive support rail 112 and an outer flange portion 144 configured to be secured to an end wall of hydrostatic bushing 116 via bolts 127. A gasket 146 is preferably positioned between each collection cylinder 118 and a respective bushing end wall to provide sealing. An annular collection nozzle 150 having a cylindrical wall portion 151 is positioned within collection chamber 156. Wall portion 151 divides collection chamber 156 into a collection portion 153 and a return portion 155. A tapered nozzle orifice 157 formed in wall portion 151 interconnects the two chamber portions.

A venturi 160 having an air supply inlet 162, an air supply outlet 164 and a suction inlet 166 is connected to reservoir 126. Venturi 160 draws a vacuum within reservoir 126 and return hoses 136 to draw hydrostatic fluid 152 from return portion 155 of collection chambers 156 into reservoir 126. Hydrostatic fluid is recirculated to supply port 130 of bearing 113 from reservoir 126 by a pump 170 via a purification system 172.

Figure 9:
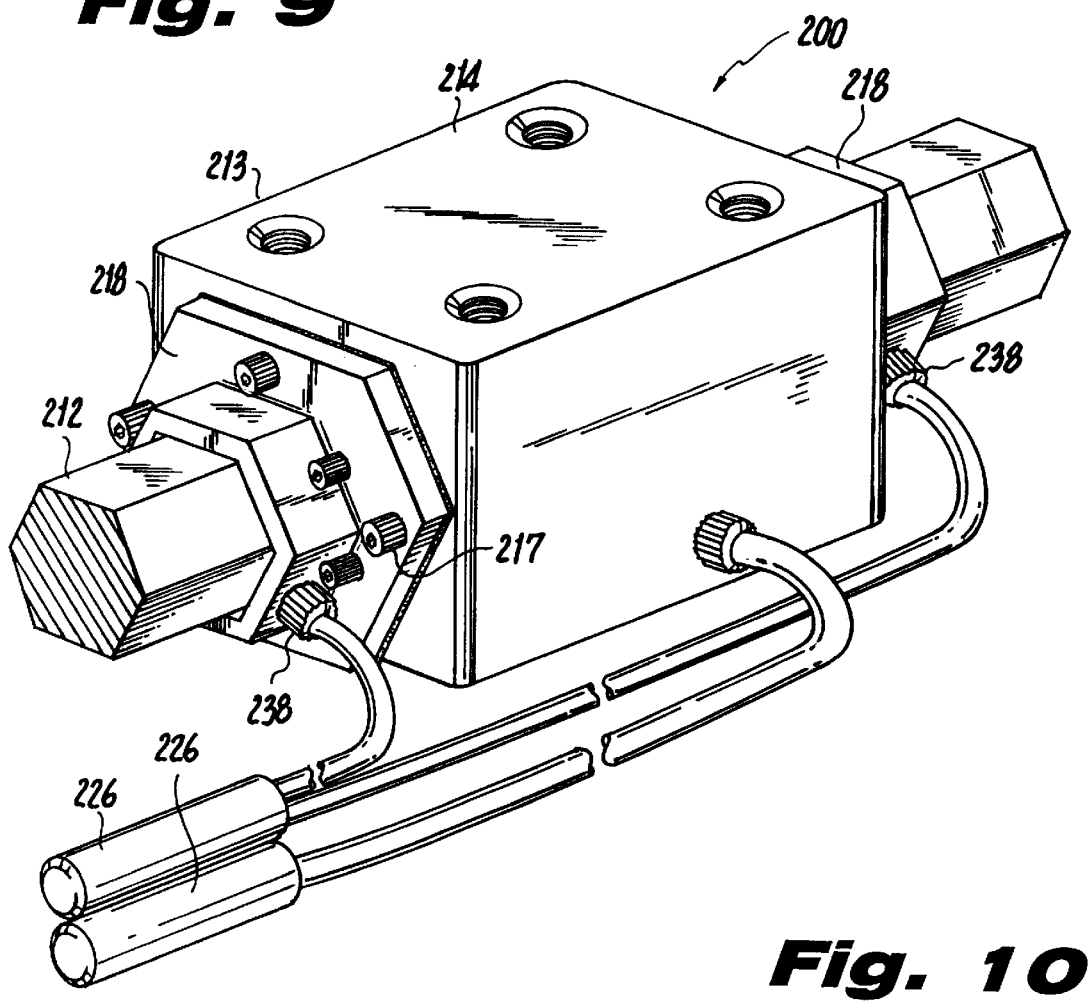
FIG. 9 is a perspective view of another alternate embodiment of the presently disclosed hydrostatic bearing and fluid return system.
Figure 10:
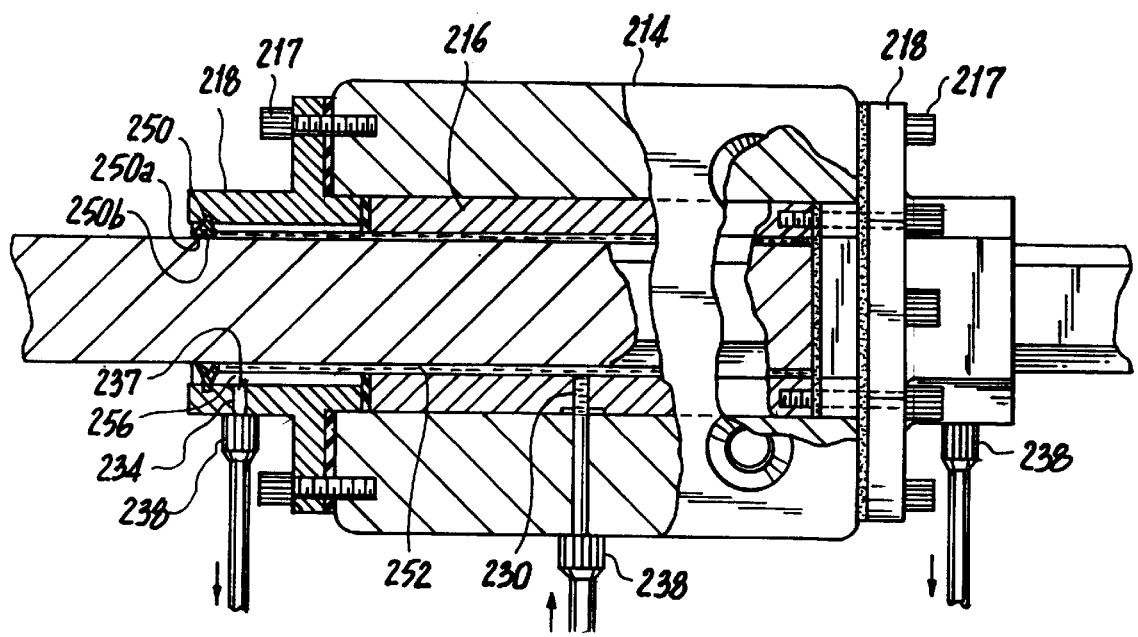
FIG. 10 is a side partial cross-sectional view of the hydrostatic bearing and fluid return system shown in FIG. 9.

FIGS. 9 and 10 illustrate an alternate embodiment of hydrostatic bearing and fluid return system shown generally as 200. Hydrostatic bearing and fluid return system 200 includes a hydrostatic bearing 213 having a rectangular housing 214 and a hydrostatic bushing 216 positioned therein. Housing 214 includes a hexagonal throughbore configured to slidably receive a hexagonal-shaped support rail 212. A pair of collectors 218 are secured to opposite ends of housing 214 and bushing 216 via threaded bolts 217. Alternately, other methods of attachment may be used to secure collectors 218 to the bearing 213. Collectors 218 also include a hexagonal throughbore configured to slidably receive support rail 212. The throughbore is dimensioned to define a collection chamber 256 with rail 212. A collection reservoir 226, shown schematically, containing hydrostatic fluid 252 is connected to return ports 234 formed in collectors 218 and a supply reservoir 232 is connected to supply port 230 formed in hydrostatic bushing 216 by flexible supply and return hoses 231 and 236, respectively. Each return hose 236 includes a distal extension 237 dimensioned to extend through housing 214 to communicate with return ports 234. A rotatable fitting 238 is positioned on one end of each supply and return hose 231 and 236 to secure each hose to the housing 214.

Each collector 218 includes a double lip seal 250 which is constructed from a resilient material, e.g., rubber, and secured to an inner wall of the collector. Seal 250 is positioned to be partially deformed by rail 212. Outwardly deformed lip 250a of double lip seal 250 prevents contaminants from entering hydrostatic bearing 213 and mixing with hydrostatic fluid 252. Inwardly deformed lip 250b of double lip seal 250 prevents hydrostatic fluid 252 from exiting collection chamber 256 defined between rail 212 and collector 218. Hydrostatic fluid 252 flowing beyond bushing 216 flows into collection chamber 256 and is retained therein by double lip seal 250 until it is returned to collection reservoir 226 via return port 234 and return hoses 236.

It will be understood that various modifications may be made to the embodiments disclosed herein. For example, the particular shape of the bearing and bearing rail need not be as illustrated herein, but rather may be modified to suit the particular application required. Moreover, different combinations of pumps, venturi, pressurized containers, etc., are envisioned to effect fluid flow between the bearing assembly and the supply and return reservoirs. Therefore, the above description should not be construed as limiting, but merely as exemplifications of preferred embodiments. Those skilled in the art will envision other modifications within the scope and spirit of the claims appended hereto.

What is claimed is:

1. A hydrostatic bearing and fluid collection system comprising:
   a hydrostatic fluid supply reservoir;
   a support rail;
   a carriage configured to be slidably supported on the support rail, the carriage and rail defining a bearing gap therebetween, the carriage having an inlet port in communication with the supply reservoir and the bearing gap to facilitate flow of fluid from the supply reservoir to the bearing gap, the carriage including a housing and at least one collection member operatively associated with the housing, the collection member being located adjacent the bearing gap and being configured to collect fluid therein;
   a hydrostatic fluid collection conduit communicating with the bearing gap, the collection conduit being configured to convey hydrostatic fluid from adjacent the gap to a remote location; and
   a seal operatively associated with the at least one collection member, the seal being positioned to engage the support rail to direct fluid on the rail into a chamber defined by the collection member, wherein the seal includes first and second resilient lips, one of the lips being positioned to direct fluid on the rail into the chamber and the other of the lips being positioned to prevent entry of debris into the bearing.

2. A hydrostatic bearing and fluid collection system according to claim 1, wherein the at least one collection member includes two collection members, one of the collection members being positioned adjacent each end of the carriage.

3. A hydrostatic bearing and fluid collection system according to claim 1, wherein the at least one collection member defines a collection chamber positioned to receive hydrostatic fluid from the bearing gap, the collection conduit having a first end in communication with the collection chamber.

4. A hydrostatic bearing and fluid collection system according to claim 3, wherein the at least one collection member includes two collection members, one of the collection members being positioned adjacent each end of the carriage.

5. A hydrostatic bearing and fluid collection system according to claim 4, wherein the collection conduit includes first and second collection conduits, each of the collection conduits being in communication with one of the collection members.

6. A hydrostatic bearing and fluid collection system comprising:
   a hydrostatic fluid supply reservoir;
   a support rail;
   a carriage configured to be slidably supported on the support rail, the carriage and rail defining a bearing gap therebetween, the carriage having an inlet port in communication with the supply reservoir and the bearing gap to facilitate flow of fluid from the supply reservoir to the bearing gap, the carriage including a housing and at least one collection member operatively associated with the housing, the collection member being located adjacent the bearing gap and being configured to collect fluid therein;
   the collection member defining a collection chamber, and the collection conduit having a first end positioned within the collection chamber and a second end in communication with a source of vacuum;
   a hydrostatic fluid collection conduit communicating with the bearing gap, the collection conduit being configured to convey hydrostatic fluid from adjacent the gap to a remote location; and
   a nozzle plate positioned in the collection chamber, the nozzle plate being positioned between the support rail and the first end of the collection conduit.

7. A hydrostatic bearing and fluid collection system according to claim 6, wherein the collection conduit has a first end positioned adjacent the bearing gap and a second end communicating with the supply reservoir.

8. A hydrostatic bearing and fluid collection system according to claim 7, wherein the supply reservoir is adapted to be connected to a source of vacuum.

9. A hydrostatic bearing and fluid collection system according to claim 6, further including a pump having an inlet communicating with the supply reservoir and an outlet communicating with the inlet port of the carriage.

10. A hydrostatic bearing and fluid collection system according to claim 9, further including a purification device communicating with the collection conduit.

11. A hydrostatic bearing and fluid collection system comprising:
    a hydrostatic fluid supply reservoir;
    a support rail;
    a carriage configured to be slidably supported on the support rail, the carriage and rail defining a bearing gap therebetween, the carriage having an inlet port in communication with the supply reservoir and the bearing gap to facilitate flow of fluid from the supply reservoir to the bearing gap, the carriage including a housing and at least one collection member operatively associated with the housing, the collection member being located adjacent the bearing gap and being configured to collect fluid therein; and
    a hydrostatic fluid collection conduit communicating with the bearing gap, the collection conduit being configured to convey hydrostatic fluid from adjacent the gap to a remote location,
   wherein the support rail is substantially cylindrical and the collection member is a stepped cylindrical ring having an outer radial portion positioned adjacent an inner wall of the housing and an inner radial portion positioned adjacent the support rail, the inner radial portion of the stepped cylindrical ring at least partially defining a collection chamber for hydrostatic fluid.

* * * * *